United States Patent
Bardon et al.

(10) Patent No.: US 7,670,404 B2
(45) Date of Patent: Mar. 2, 2010

(54) STRUCTURE FOR FILTERING EXHAUST GASES OF AN INTERNAL COMBUSTION ENGINE, AND ASSOCIATED EXHAUST LINE

(75) Inventors: Sébastien Bardon, Cavaillon Cedex (FR); Anthony Briot, Avignon (FR); Vincent Gleize, Avignon (FR)

(73) Assignee: Saint-Gobain Centre de Recherches Et d'Etudes Europeen, Courbevoie (FR)

( * ) Notice: Subject to any disclaimer, the term of this patent is extended or adjusted under 35 U.S.C. 154(b) by 214 days.

(21) Appl. No.: 11/574,683

(22) PCT Filed: Sep. 2, 2005

(86) PCT No.: PCT/FR2005/002195

§ 371 (c)(1),
(2), (4) Date: Aug. 9, 2007

(87) PCT Pub. No.: WO2006/027487

PCT Pub. Date: Mar. 16, 2006

(65) Prior Publication Data

US 2008/0034744 A1 Feb. 14, 2008

(30) Foreign Application Priority Data

Sep. 6, 2004 (FR) .................................. 04 09407
Dec. 8, 2004 (FR) .................................. 04 13089

(51) Int. Cl.
*B01D 39/00* (2006.01)
*B01D 39/14* (2006.01)
*B01D 39/06* (2006.01)
*B01D 50/00* (2006.01)
*F01N 3/10* (2006.01)
*F01N 3/08* (2006.01)

(52) U.S. Cl. ............................. 55/523; 55/522; 55/524; 422/170; 422/171; 422/172; 422/173; 422/174; 422/175; 422/176; 422/177; 422/178; 422/179; 422/180; 422/181; 422/182

(58) Field of Classification Search ........... 55/522–524; 422/170–182

See application file for complete search history.

(56) References Cited

U.S. PATENT DOCUMENTS 4,422,861 A * 12/1983 Dusza .......................... 55/498

(Continued)

FOREIGN PATENT DOCUMENTS

| EP | 1 382 374 A1 | 1/2004 |
| FR | 2 816 002 A1 | 5/2002 |
| WO | WO01/93984 | * 12/2001 |

*Primary Examiner*—Walter D Griffin
*Assistant Examiner*—Amber Orlando
(74) *Attorney, Agent, or Firm*—Sughrue Mion, PLLC

(57) ABSTRACT

This structure (11) comprises first and second filtering elements (15A, 15B) extending essentially parallel to a longitudinal axis (X-X') of the structure (11) between an admission region (21) of the gases into the structure (11) and an evacuation region (23) of the gases from the structure, and comprises a seal (17) for joining these elements (15A, 15B). The seal (17) comprises at least one downstream pat (43) which has a thermal mass per unit length greater than the thermal mass per unit length of an upstream part (41) of the seal (17). The invention is for use in particulate filters for the exhaust gases of a motor vehicle diesel engine.

11 Claims, 4 Drawing Sheets

U.S. PATENT DOCUMENTS

| Patent No. | Date | Inventor(s) | Class |
|---|---|---|---|
| 5,405,423 A | 4/1995 | Haerle | |
| 5,853,437 A * | 12/1998 | Peter et al. | 55/282.3 |
| 5,989,420 A * | 11/1999 | Sugimoto | 210/222 |
| 6,508,852 B1 * | 1/2003 | Hickman et al. | 55/523 |
| 6,652,615 B2 * | 11/2003 | Quick et al. | 55/502 |
| 6,939,522 B1 * | 9/2005 | Harada et al. | 422/211 |
| 6,984,253 B2 * | 1/2006 | Ichikawa et al. | 55/484 |
| 7,138,002 B2 * | 11/2006 | Hamanaka et al. | 55/523 |
| 7,294,316 B2 * | 11/2007 | Harada et al. | 422/180 |
| 7,326,271 B2 * | 2/2008 | Kasai et al. | 55/523 |
| 7,332,014 B2 * | 2/2008 | Ono et al. | 55/523 |
| 7,435,279 B2 * | 10/2008 | Masukawa et al. | 55/523 |
| 7,438,967 B2 * | 10/2008 | Fujita | 428/116 |
| 2009/0060438 A1 * | 3/2009 | Mori et al. | 385/127 |

* cited by examiner

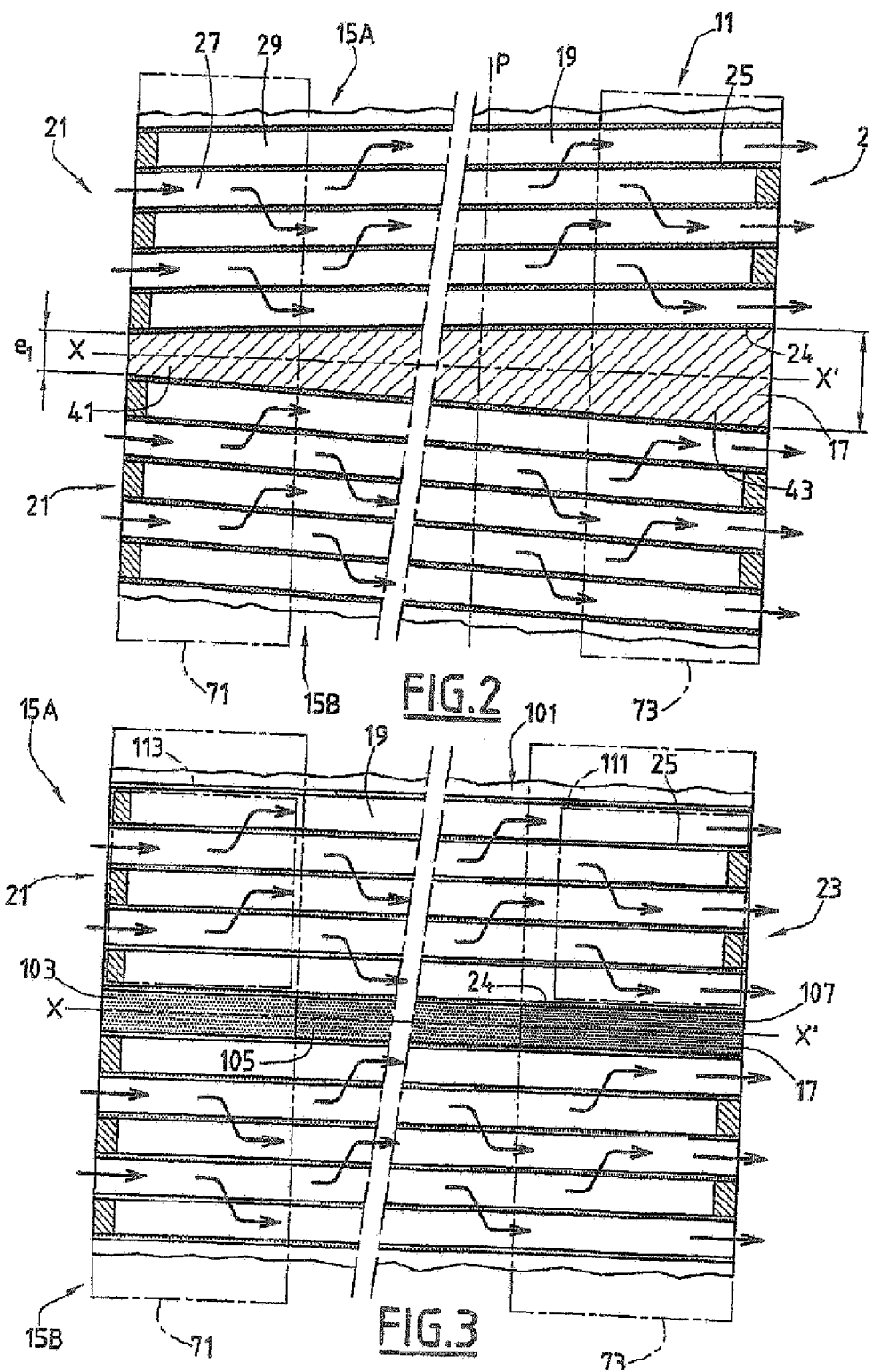

STRUCTURE FOR FILTERING EXHAUST GASES OF AN INTERNAL COMBUSTION ENGINE, AND ASSOCIATED EXHAUST LINE

The present invention relates to a structure for filtering the exhaust gases from an internal-combustion engine, of the type comprising:
- at least first and second filtration means extending substantially parallel to a longitudinal axis of the structure between a region for the intake of gases into the structure and a region for the discharge of gases from the structure; and
- a seam for connecting said means.

Structures of this type are used, in particular, in devices for depolluting the exhaust gases from motor vehicle diesel engines. These devices include an exhaust line comprising a catalytic purification means and a particle filter in series. The catalytic purification means is adapted to treat polluting emissions in the gaseous phase whereas the particle filter is adapted to retain the particles of soot emitted by the engine.

In known structures of the aforementioned type (see, for example, FR 2 816 002), the filtration means comprise an assembly of adjacent conduits which have parallel axes and are separated by porous filtration walls. These conduits extend between an intake face and a discharge face. These conduits are also blocked at one or other of their ends to delimit inlet chambers which open at the intake face and outlet chambers which open at the discharge face.

These structures operate in a succession of filtration and regeneration phases. During the filtration phases, the soot particles emitted by the engine are deposited on the inlet chamber walls. The pressure drop through the filter gradually increases. Beyond a predetermined value of this pressure drop, a regeneration phase is carried out.

During the regeneration phase, the soot particles, which are basically composed of carbon, are burnt on the walls of the inlet chambers in order to restore the original properties to the structure.

The soot particles do not accumulate homogeneously in the filtration means. Thus, the soots accumulate preferentially in the centre of the filtration structure and toward the exhaust gas discharge face.

To initiate soot combustion, igniters are disposed in the exhaust line, in the vicinity of the intake faces of the filtration means. Consequently, combustion begins at the front and the centre of the filter and is then propagated toward the rear.

Structures of this type are not completely satisfactory. It is sometimes difficult to initiate combustion owing to the low soot content in the filtration means in the vicinity of the upstream face. Furthermore, when combustion reaches the discharge face the temperature prevailing in the vicinity of this face increases markedly owing to the high soot content. It is therefore difficult to control the regeneration phases.

An object of the invention is to provide an exhaust gas filtration structure for an internal-combustion engine in which the control of the regeneration phases is facilitated.

The invention accordingly relates to a filtration structure of the aforementioned type which is characterised in that the seam comprises at least a downstream portion having a thermal mass per unit length greater than the thermal mass per unit length of an upstream portion of the seam.

The term "thermal mass" denotes, for a given volume of material, the product of the average calorific capacity of this material times the mass of material in the given volume.

The filtration structure can have one or more of the following features, taken in isolation or in any technically feasible combination:
- the seam has a thermal mass per unit length which increases substantially continuously along the seam between the intake region and the discharge region;
- the seam, along said longitudinal axis, has a plurality of portions each having a substantially constant thermal mass per unit length;
- the downstream portion of the seam has an average thickness greater than the average thickness of the upstream portion of the seam;
- the thickness of the seam is substantially constant along the longitudinal axis;
- the downstream portion of the seam has a density greater than the density of the upstream portion of the seam;
- the downstream portion of the seam has a porosity lower than the porosity of the upstream portion of the seam;
- at least one of the first and second filtration means comprises at least one downstream region having a thermal mass per unit length greater than the thermal mass per unit length of an upstream region of this filtration means;
- it has a peripheral region having a thermal mass per unit volume which is less than the thermal mass per unit volume of a central region of the structure;
- the filtration means comprise mutually facing first and second faces respectively which are attached to one another by the connecting seam, the first face comprising:
  - at least one region of strong adhesion to the seam and situated substantially so as to face a region of weak or zero adhesion to said seam of the second face; and
  - at least one region of weak or zero adhesion to the seam situated substantially so as to face a region of strong adhesion to said seam of the second face.

The invention further relates to a motor vehicle exhaust line, characterised in that it comprises a structure as defined hereinbefore.

Embodiments of the invention will now be described with reference to the accompanying drawings, in which:

FIG. 2 is a partial section over the plane II-II of the filter in FIG. 1;

FIG. 3 is a view similar to FIG. 2 of a second filter according to the invention;

Figure 1:
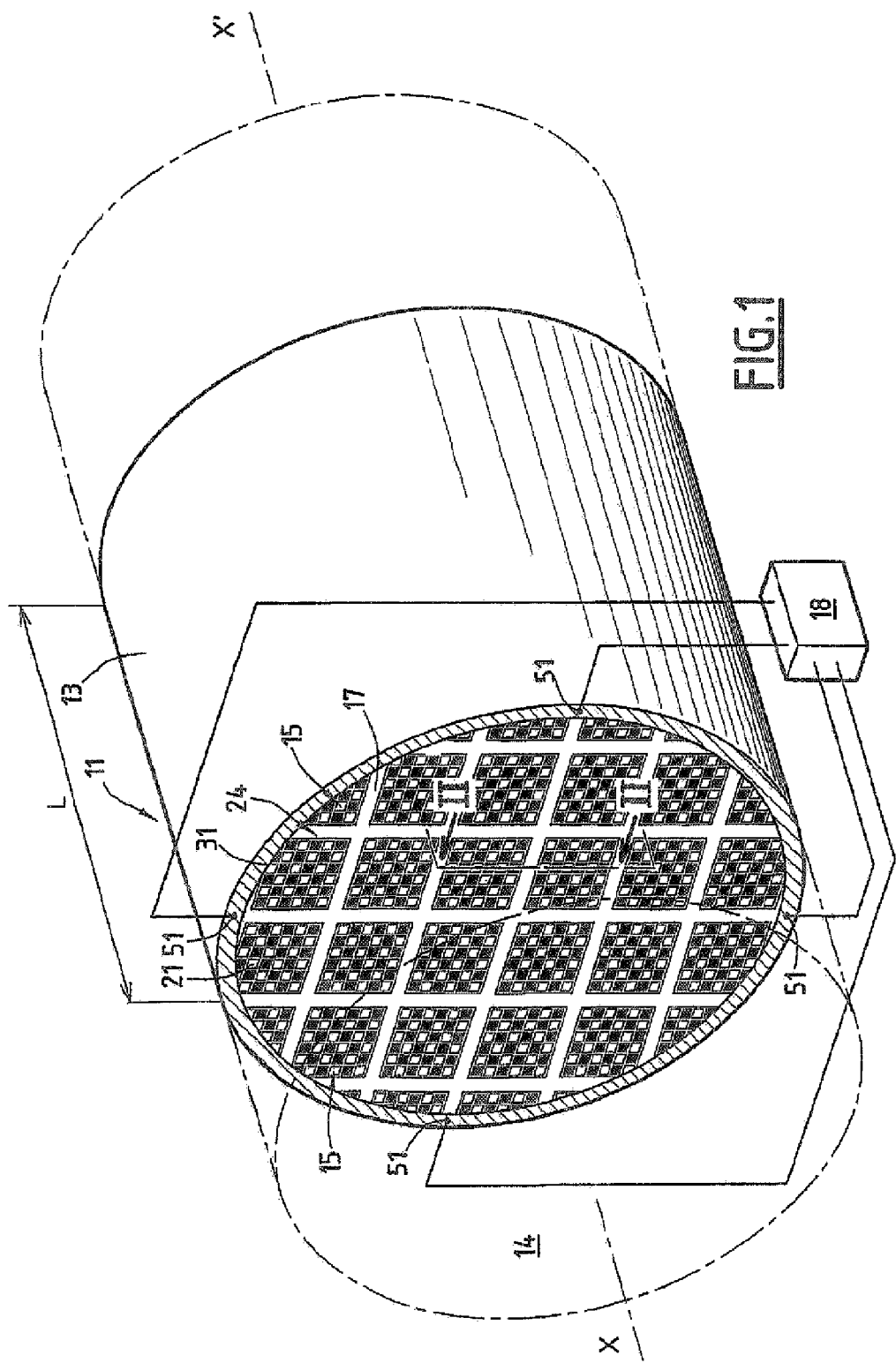
FIG. 1 is a perspective view of a first filter according to the invention.

The particle filter 11 shown in FIG. 1 is disposed in a motor vehicle diesel engine exhaust gas line 13, shown in part.

This exhaust line 13 extends beyond the ends of the particle filter 11 and delimits a passage 14 for the movement of the exhaust gases.

The particle filter 11 extends over a length L along a longitudinal axis X-X' for the movement of the exhaust gases and comprises a plurality of juxtaposed filtration units 15 of length L, which are attached to one another by connecting seams 17 disposed between the adjacent faces of the units 15. It further comprises regeneration initiating means 18.

Each filtration unit 15 is substantially in the form of a right parallelepiped elongated in parallel with the axis X-X'.

As illustrated in FIG. 2, which shows two filtration units 15A, 15B, each unit 15A, 15B comprises a porous filtration structure 19, a face 21 for the intake of the exhaust gases to be filtered, a face 23 for the discharge of the filtered exhaust gases, and active lateral faces 24 (four faces for common units).

The faces 21 and 23 are planar and are substantially perpendicular to the axis X-X'.

The porous filtration structure 19 is produced from a filtration material consisting of a monolithic structure, in particular of ceramic (cordierite, silicon carbide, etc.).

This structure 19 has sufficient porosity to allow the passage of the exhaust gases. As known per se, however, the diameter of the pores is selected to be sufficiently small to allow retention of the soot particles.

The porous structure 19 comprises an assembly of adjacent conduits of which the axes are substantially parallel to the axis X-X'. These conduits are separated by porous filtration walls 25. In the example illustrated in FIG. 1, these walls 25 are of constant thickness and extend longitudinally in the filtration structure 19 from the intake face 21 to the discharge face 23.

The conduits are distributed in a first group of inlet conduits 27 and a second group of outlet conduits 29. The inlet conduits 25 and the outlet conduits 29 are arranged head to toe.

The inlet conduits 27 are blocked in the region of the discharge face 23 of the filtration unit 15A, 15B and are open at their other end.

On the other hand, the outlet conduits 29 are blocked in the region of the intake face 21 of the filtration unit 15A, 15B and open at its discharge face 23.

In the example illustrated in FIG. 1, the inlet conduits 27 and outlet conduits 29 have cross-sections which are constant over their entire length.

The intake faces 21 of the units 15, on the one hand, and the discharge faces 23 thereof, on the other hand, are substantially coplanar and define a face for the intake of the gases into the filter 11 and a face for the discharge of the gases from the filter 11 respectively.

As shown in FIG. 1, the lateral faces 24 of the filtration unit facing another filtration unit are planar. The lateral faces 31 facing the exhaust line 13 are of a shape which is adapted to ensure contact with the cylindrical internal wall of this line 13.

The connecting seam 17 is disposed between the planar faces 24 of the filtration units 15. This connecting seam 17 is produced, for example, on the basis of ceramic cement, generally consisting of silica and/or silicon carbide and/or aluminium nitride. After sintering, this cement has a modulus of elasticity of approximately 5,000 MPa. The filtration units 15 are thus fixed together by the seam 17.

In the example illustrated in FIG. 2, the connecting seam 17 has a thickness which increases continuously along the axis X-X'. This thickness increases linearly between a thickness $e_1$ in the plane of the intake faces 21 and a thickness $e_2$ in the plane of the discharge faces 23.

The thickness $e_1$ is between 0.5 mm and 1 mm, for example, and the thickness $e_2$ between 2 mm and 5 mm, for example.

In addition, seam 17 has a homogeneous structure along the filter 11.

As illustrated in FIG. 2, upstream and downstream portions 41, 43 of the seam 17 extend on either side of a plane P transverse to the filter 11 situated between the intake faces 21 and the discharge faces 23 of the units 15A, 15B respectively. These upstream and downstream portions 41, 43 are also delimited by the plane of the intake faces 21 and the plane of the discharge faces 23 respectively.

The thermal mass per unit length, taken along the axis X-X', of the downstream portion 43 is greater than the thermal mass per unit length of the upstream portion 41.

Referring to FIG. 1, the regeneration initiating means 18 comprise igniters 51 which project into the passage 14 for movement of the exhaust gases in the vicinity of the upstream face 21.

These igniters 51, for example, are of the type described in the application FR 2 816 002.

Operation of the first filter 11 according to the invention will now be described.

During a filtration phase (FIG. 1), the particle-laden exhaust gases are guided to the inlet faces 21 of the filtration units 15 via the exhaust line 13. As indicated by the arrows in FIG. 2, they then penetrate into the inlet conduits 27 and pass through the walls 25 of the porous structure 19. During this passage, the soot is deposited on the walls 25 of the inlet conduits 27. This soot is deposited preferentially in the centre of the particle filter 11 and toward the discharge face 23 of the filtration units 15 (on the right of the drawing).

The filtered exhaust gases escape through the discharge conduits 29 and are guided toward the outlet of the exhaust line 13.

Once the vehicle has traveled approximately 500 km, the pressure drop through the filter 11 increases significantly. A regeneration phase is then carried out.

During this phase, the igniters 51 are activated so that the temperature of the exhaust gases is increased in the vicinity of the intake faces 21. When these gases reach adequate temperatures, they initiate soot combustion in the units 15, in the upstream region 71 of the filter situated in the vicinity of the intake faces 21.

Owing to the low thermal mass per unit length in the upstream region 71, the temperature prevailing there rise rapidly to a range which is adapted to allow combustion of the suit, despite the low soot content in this region 71.

Combustion is then propagated toward the discharge faces 23. Owing to the high soot content in the downstream region 73 of the filter 11, the thermal power generated by the combustion of this soot is high in this region 73.

However, the rise in temperature in this downstream region 73 is limited by the high thermal mass per unit length in the downstream portion 43 of the seam 17.

Thus, during the regeneration phases, the filter 11 according to the invention facilitates initiation of soot combustion in the vicinity of the intake faces 21 and limits the runaway of this combustion when it comes into the vicinity of the discharge faces 23. Controlling of the regeneration phases is thus facilitated in this filter 11.

In the second filter 101 according to the invention, shown with reference to FIG. 3, the seam 17 has a constant thickness along the axis X-X'.

The seam 17 comprises a plurality of portions 103, 105, 107, along the axis X-X' and from upstream to downstream, each portion 103, 105, 107 having a constant density. The density of the portions 103, 105, 107 of the seam 17 increases along the filter so that the downstream portion 107 has a thermal mass per unit length which is greater than the thermal mass per unit length of the intermediate portion 105, which has a thermal mass per unit length greater than the thermal mass per unit length of the upstream portion 103.

Hence, the density of the downstream portion 107 is, for example, between 2 and 3, the density of the intermediate portion 105 is, for example, between 1.5 and 2.5 and the density of the upstream portion 103 is, for example, between 1 and 1.5.

In a first variation of this filter 101, the seam 17 comprises a plurality of portions 103, 105, 107 along the axis X-X' from upstream to downstream, each portion having constant porosity.

The porosity of the portions 103, 105, 107 decreases along the filter 101 so that the downstream portion 107 has a thermal mass per unit length which is greater than the thermal mass per unit length of the intermediate portion 105, which has a thermal mass per unit length greater than the thermal mass per unit length of the upstream portion 103.

Hence, the porosity of the upstream portion 103 is, for example, between 45% and 50%, the porosity of the intermediate portion 105 is, for example, between 40% and 45%, and the porosity of the downstream portion 107 is, for example, between 35% and 40%.

In a second variation of this filter 101, the porosity and/or the density of the seam varies continuously along the seam 17 so that the thermal mass per unit length also varies continuously along the seam 17.

In a third variation of this filter 101, the walls themselves of the filtration units 15A, 15B also have a porosity which decreases along the axis X-X'. The units 15A, 15B thus have a downstream region 111 of thermal mass per unit length along the filter 101 which is greater than the thermal mass per unit length of an upstream region 113. Hence, the thermal mass per unit length of the filtration units 15A, 15B increases along the filter 101.

Figure 4:
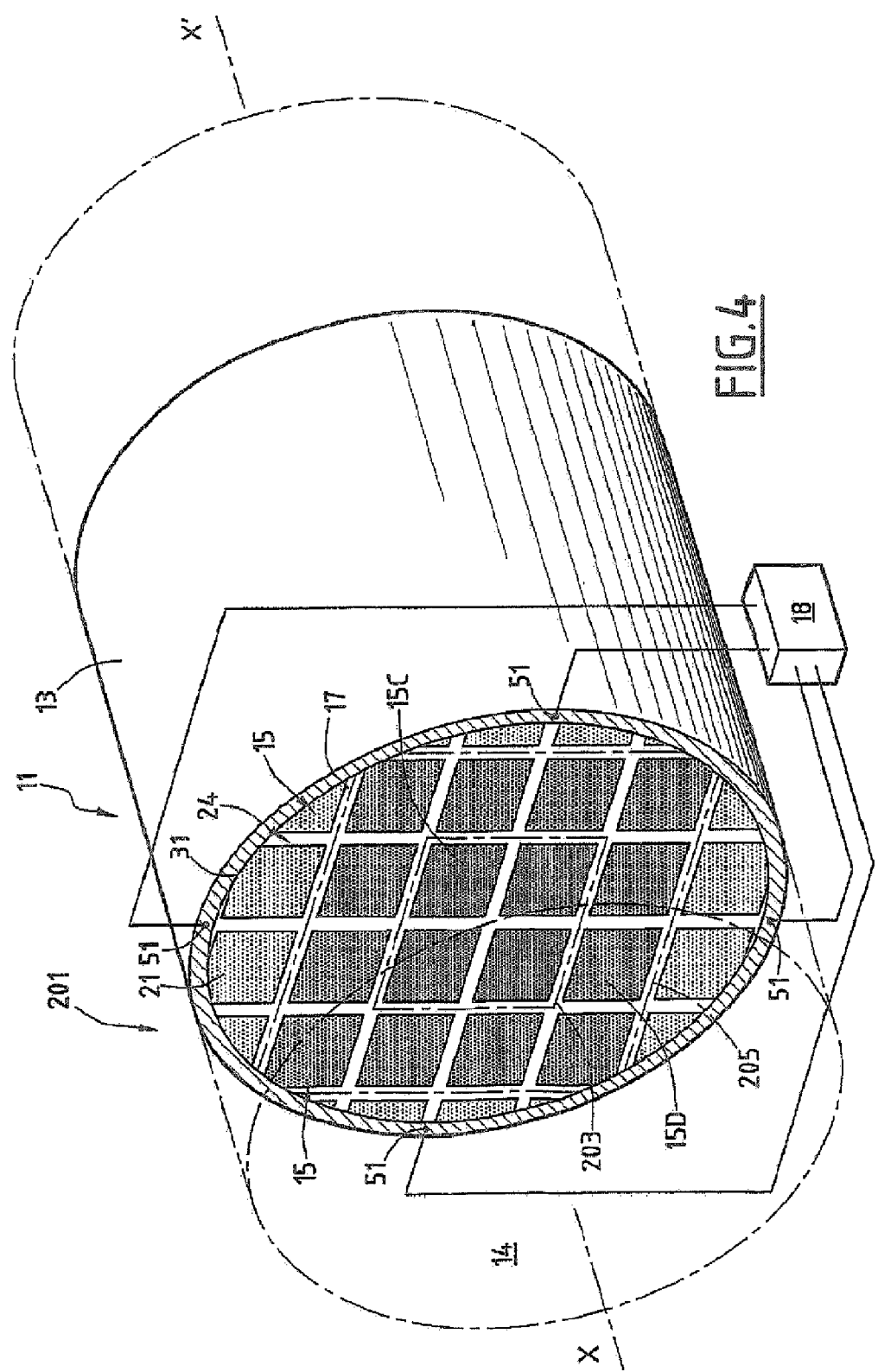
FIG. 4 is a view similar to FIG. 1 of a third filter according to the invention.

In the filter 201 shown in FIG. 4 and in contrast to the filter 11 shown in FIG. 1, the peripheral filtration units 15D have, in at least a transverse plane, a thermal mass per unit volume which is smaller than the thermal mass per unit volume of the filtration units 15C situated in the centre of the filter 201.

Hence, the central region 203, which has a relatively greater soot content, has a thermal mass per unit volume which is greater than the peripheral region 203 having a relatively lower soot content.

In addition, similarly to the filter 11 in FIG. 1, the seam 17 comprises a downstream portion having a thermal mass per unit length which is greater than the thermal mass per unit length of an upstream portion of this seam 17.

Owing to the invention which has just been described, it is possible to have a filtration structure in which the implementation and controlling of the regeneration phases are facilitated. The thermal mass of the structure is effectively adapted to the soot distribution therein, so that the regions having a large accumulation of soot have a greater thermal mass than the regions having a small accumulation of soot.

In particular, this distribution of the thermal masses in the structure promotes the initiation of soot combustion in the vicinity of the intake faces and limits the increase in the temperature in the vicinity of the discharge faces during the regeneration phases.

Figure 5:
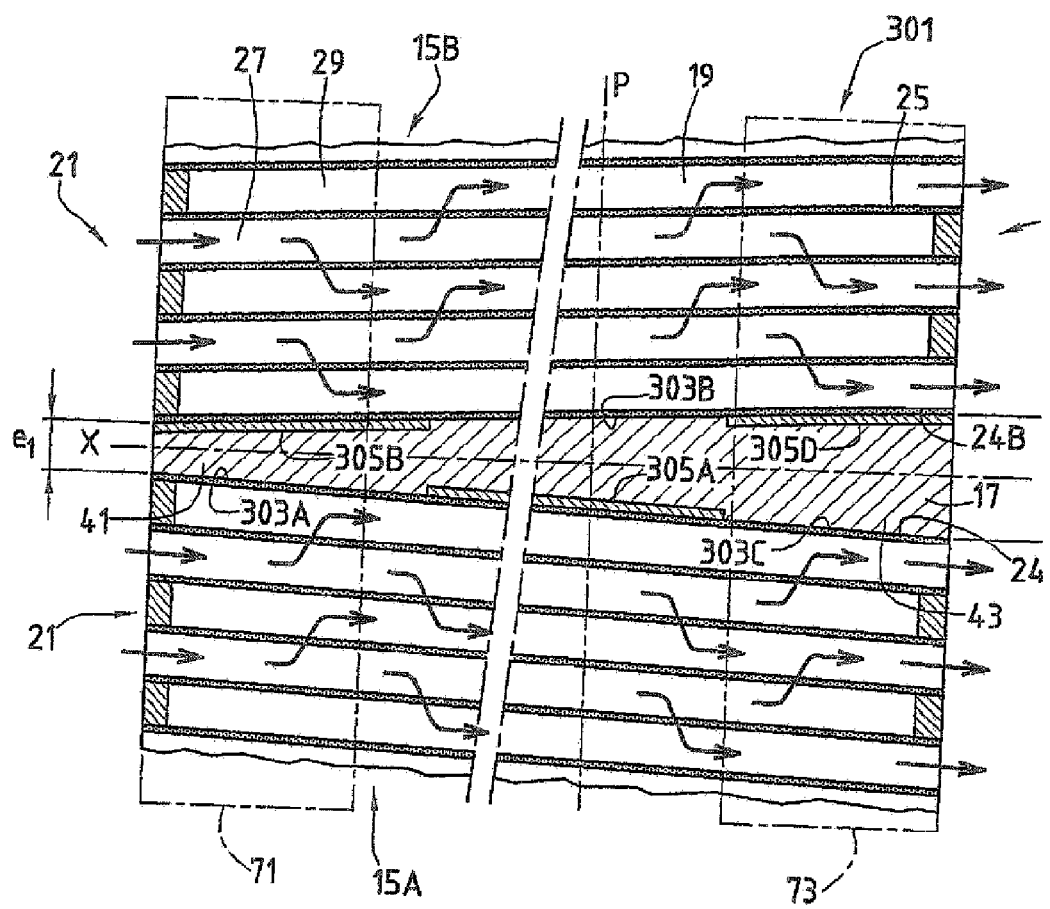
FIG. 5 is a view similar to FIG. 2 of a variation of the first filter according to the invention.

The filter 301 shown in FIG. 5 differs from the filter 11 shown in FIGS. 1 and 2 by the following features.

The respective lateral faces 24A and 24B of the first and second units 15A and 15B, which face one another, each comprise at least one region 303 which is rigidly connected to the seam 17 and at least one region 305 which, during manufacture of the filter 301, is covered by a non-stick coating. This coating is formed, for example, on the basis of paper, polytetrafluoroethylene, polyethylene, polypropylene, graphite or boron nitride.

Hence, each region 303 forms a region of strong adhesion to the seam 17, which is hereinafter designated by "region of strong adhesion" whereas each region 305 forms a region of weak or zero adhesion to the seam 17, denoted hereinafter as "region of weak or zero adhesion".

The adhesion between the connecting seam 17 and the lateral faces 24 in the regions of strong adhesion 303 is at least ten times greater than the adhesion between the connecting seam 17 and the lateral faces 24 in the regions of weak or zero adhesion 305, which is between 0 and 50 MPa.

In the example shown in FIG. 5, the lateral face 24A of the first filtration unit 15A comprises, in succession, from the intake face 21 toward the discharge face 23, a first region 303A of strong adhesion, a region 305A of weak or zero adhesion and a second region 303C of strong adhesion.

Each region of strong adhesion 303A, 303C of the first face 24A is disposed substantially so as to face a region 305B, 305D of weak or zero adhesion of the second phase 24B. Similarly, each region of weak or zero adhesion 305A of the first face 24A is disposed substantially so as to face a region 303B of strong adhesion of the second face 24B.

This variation can also be employed in the filter 201 shown in FIG. 3.

The invention claimed is:

1. A structure for filtering the exhaust gases from an internal-combustion engine, said structure comprising:
   first and second filtration means extending substantially parallel to a longitudinal axis of the structure between an intake region for taking gases into the structure and a discharge region for discharging gases from the structure; and
   a seam for connecting said first and second filtration means, wherein
   the seam comprises a downstream portion having a thermal mass per unit length greater than a thermal mass per unit length of an upstream portion of the seam;
   wherein said first and second filtration means each comprise a plurality of adjacent conduits;
   wherein the upstream portion of the seam is delimited by a plane of an intake face of the intake region; and
   wherein the downstream portion of the seam is delimited by a plane of a discharge face of the discharge region.

2. The structure according to claim 1, wherein the seam has a thermal mass per unit length which increases substantially continuously along the seam between the intake region and the discharge region.

3. The structure according to claim 1, wherein the seam, along said longitudinal axis, has a plurality of portions, each portion having a substantially constant thermal mass per unit length.

4. The structure according to claim 1, wherein the downstream portion of the seam has an average thickness greater than the average thickness of the upstream portion of the seam.

5. The structure according to claim 1, wherein the thickness of the seam is substantially constant along the longitudinal axis.

6. The structure according to claim 1, wherein the downstream portion of the seam has a density greater than the density of the upstream portion of the seam.

7. The structure according to claim 1, wherein the downstream portion of the seam has a porosity lower than the porosity of the upstream portion of the seam.

8. The structure according to claim 1, wherein at least one of the first and second filtration means comprises at least one downstream region having a thermal mass per unit length greater than the thermal mass per unit length of an upstream region of said at least one of the first and second filtration means.

9. The structure according to claim 1, wherein the structure has a peripheral region having a thermal mass per unit volume less than the thermal mass per unit volume of a central region of the structure.

10. The structure according to claim 1, wherein each of the first and second filtration means comprise mutually facing first and second faces, respectively which are attached to one another by the seam, the first face (24A) comprising:

at least one region of strong adhesion to the seam, which substantially faces a region of the second face having weak or zero adhesion to said seam; and at least one region of weak or zero adhesion to the seam, which substantially faces a region of the second face having strong adhesion to said seam.

11. A motor vehicle exhaust line, comprising the structure according to claim 1.

* * * * *